United States Patent [19]

Eifert et al.

[11] Patent Number: 5,448,744
[45] Date of Patent: Sep. 5, 1995

[54] INTEGRATED CIRCUIT MICROPROCESSOR WITH PROGRAMMABLE CHIP SELECT LOGIC

[75] Inventors: James B. Eifert; John J. Vaglica; James C. Smallwood; Mark W. McDermott, all of Austin, Tex.; Hiroyuki Sugiyama, Tokyo, Japan; William P. LaViolette; Bradley G. Burgess, both of Austin, Tex.

[73] Assignee: Motorola, Inc., Schaumburg, Ill.

[21] Appl. No.: 432,423

[22] Filed: Nov. 6, 1989

[51] Int. Cl.6 .................. G06F 9/22; G06F 13/10
[52] U.S. Cl. ................. 395/800; 364/DIG. 1; 364/240.5; 364/238.3
[58] Field of Search ............... 395/275, 725, 800

[56] References Cited

U.S. PATENT DOCUMENTS

| | | | |
|---|---|---|---|
| 3,972,028 | 7/1976 | Weber et al. | 395/425 |
| 4,050,096 | 9/1977 | Bennett et al. | 395/425 |
| 4,159,516 | 6/1979 | Henrion et al. | 395/275 |
| 4,263,650 | 4/1981 | Bennett et al. | 395/275 |
| 4,368,512 | 1/1983 | Kyu et al. | 395/325 |
| 4,692,895 | 9/1987 | Huffman | 395/275 |
| 4,727,477 | 2/1988 | Gavril | 395/275 |
| 4,777,591 | 10/1988 | Chang et al. | 395/800 |
| 4,958,277 | 9/1990 | Hill et al. | 395/275 |

Primary Examiner—Krisna Lim
Attorney, Agent, or Firm—Jonathan P. Meyer

[57] ABSTRACT

An integrated circuit microprocessor has on-board programmable chip select logic. Each of several chip select outputs is individually programmable by means of one or more control register bit fields. For instance, each chip select is asserted for bus cycles within an address range whose starting address and block size are both programmable. In addition, each chip select can be programmed to be active on read cycles only, on write cycles only, or on both read and write cycles. Each chip select can be programmed to be active during interrupt acknowledge cycles only if the interrupt being acknowledged has the same priority level as has been programmed for that chip select. In addition, the timing of the assertion of each chip select is programmable to coincide with either the address strobe or data strobe of the bus cycle. The chip select logic is designed so that it is configured to come out of reset by producing an active chip select signal during the first bus cycle run by the processor following the reset. This chip select is appropriate for selecting a boot ROM, and may later be re-programmed for other use. The chip select logic is capable of supporting cycle-by-cycle dynamic bus sizing by asserting appropriate cycle termination signals. The chip select logic can also insert a programmable number of wait states into a bus cycle to accommodate slow peripherals or can cause a fast termination of a bus cycle to improve the utilization of fast peripherals.

36 Claims, 6 Drawing Sheets

FIG. 2A

| 15 | | | | | | | | | | | | | | | | 0 |
|---|---|---|---|---|---|---|---|---|---|---|---|---|---|---|---|---|
| 0 | 0 | CS5(FC2) | CS4(FC1) | CS3(FC0) | CS2($\overline{BGACK}$) | CS1($\overline{BG}$) | CS0($\overline{BR}$) | CSBOOT |

CHIP SELECT PIN ASSIGNMENT REGISTER 0 (CSPAR0)

FIG. 2B

| 15 | | | | | | | | | | | | | | | | 0 |
|---|---|---|---|---|---|---|---|---|---|---|---|---|---|---|---|---|
| 0 | 0 | 0 | 0 | CS10(A23) | CS9(A22) | CS8(A21) | CS7(A20) | CS6(A19) |

CHIP SELECT PIN ASSIGNMENT REGISTER 1 (CSPAR1)

FIG. 2C

| 15 | | | | | | | | | | | | | 3 | 2 | | 0 |
|---|---|---|---|---|---|---|---|---|---|---|---|---|---|---|---|---|
| BASE ADDRESS | | | | | | | | | | | | | BLOCK SIZE | | | |

BASE ADDRESS REGISTERS (CSBRBT, CSBR0–CSBR10)

FIG. 2D

| 15 | 14 | 13 | 12 | 11 | 10 | 9 | 6 | 5 | 4 | 3 | 1 | 0 |
|---|---|---|---|---|---|---|---|---|---|---|---|---|
| MODE | BYTE | | R/W | STRB | DSACK | | SPACE | | IPL | | AVEC |

CHIP SELECT OPTION REGISTERS (CSORBT, CSOR0–CSOR10)

INTEGRATED CIRCUIT MICROPROCESSOR WITH PROGRAMMABLE CHIP SELECT LOGIC

FIELD OF THE INVENTION

The present invention relates, in general, to integrated circuit microprocessors. More particularly, the invention relates to such microprocessors which have internal logic for generating chip select signals for use in interfacing with external devices.

BACKGROUND OF THE INVENTION

Integrated circuit microprocessors must, in many cases, be connected with other integrated circuit devices in order to provide certain functions. Examples of such external devices include memories, serial interface adaptors, analog-to-digital converters and many others. In most cases, each such external device will require an input signal, which is usually referred to as a chip select signal, in order for the device to be appropriately activated when accessed by the microprocessor.

Typically, a designer of a system using a microprocessor and other integrated circuits will use "glue logic" to generate the required chip select signals from the address and bus control signals produced by the microprocessor itself. This extra logic adds significantly to the cost of the system being designed and, therefore, is highly undesirable.

The 80196 (also referred to as the iAPX 186), available from the Intel Corporation of Santa Clara, California, is an integrated circuit microprocessor which has internal logic for generating chip select signals. The chip select logic has limited ability to program the address range for which each of the seven possible chip selects is active and can programmably insert wait states into the bus cycles for which each chip select is active. In addition, some of the chip selects may be programmed to be active in only the memory or I/O address spaces of the microprocessor.

Another example of an integrated circuit microprocessor with on-board chip select logic is the MC68HC11F1, available from Motorola, Inc. of Austin, Tex. The chip select logic of this microprocessor is disclosed in the U.S. Pat. No. 5,151,986, issued on Sep. 29, 1992. The chip select logic of this part includes a control register by means of which the timing, polarity and number of wait states can be individually programmed for each of several chip select outputs.

A major problem associated with the integration of chip select logic onto a microprocessor integrated circuit involves the provision of sufficient flexibility to the user. The use of glue logic is extremely flexible, since the system designer has wide latitude in the placement of each external device with the microprocessor's memory map and the timing and other characteristics of the chip select signals themselves. This flexibility is very useful, since the variety of possible system designs and chip select requirements for particular peripheral devices is great. Providing sufficient flexibility in an integrated chip select unit while constraining the size of the unit within reasonable limits is quite difficult.

SUMMARY OF THE INVENTION

Accordingly, it is an object of the present invention to provide an improved integrated circuit microprocessor with chip select logic.

This and other objects and advantages of the present invention are provided by an integrated circuit microprocessor comprising: a central processing unit; bus controller means coupled to the central processing unit and to a plurality of pins of the integrated circuit microprocessor for operating a bus external to the integrated circuit microprocessor; and chip select means coupled to the central processing unit and to a pin of the integrated circuit microprocessor for selectively providing, under control of the central processing unit, a chip select signal to a device external to the integrated circuit microprocessor; wherein the improvement comprises: a chip select control register means coupled to the chip select means and to the central processing unit for storing, under control of the central processing unit, a first bit field; and the chip select means is responsive to the states of the bits of the first bit field of the chip select control register means to selectively assert the chip select signal only while the bus controller means is executing a write cycle of the bus, only while the bus controller is executing a read cycle of the bus or while the bus controller is executing either a read cycle or a write cycle of the bus.

This and other objects and advantages of the present invention will be apparent from the detailed description below taken together with the drawings.

BRIEF DESCRIPTION OF THE DRAWINGS

FIG. 2A is a diagram illustrating the bit fields of one of the registers of the chip select logic of the apparatus of FIG. 1;

FIG. 2B is a diagram illustrating the bit fields of one of the registers of the chip select logic of the apparatus of FIG. 1;

FIG. 2C is a diagram illustrating the bit fields of one of the registers of the chip select the apparatus of FIG. 1;

FIG. 2D is a diagram illustrating the bit fields of one of the registers of the chip select logic of the apparatus of FIG. 1;

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In addition, the terms "set" and "clear" will be used when referring to the rendering of a status bit or similar apparatus into its logically true or logically false state, respectively.

Figure 1:
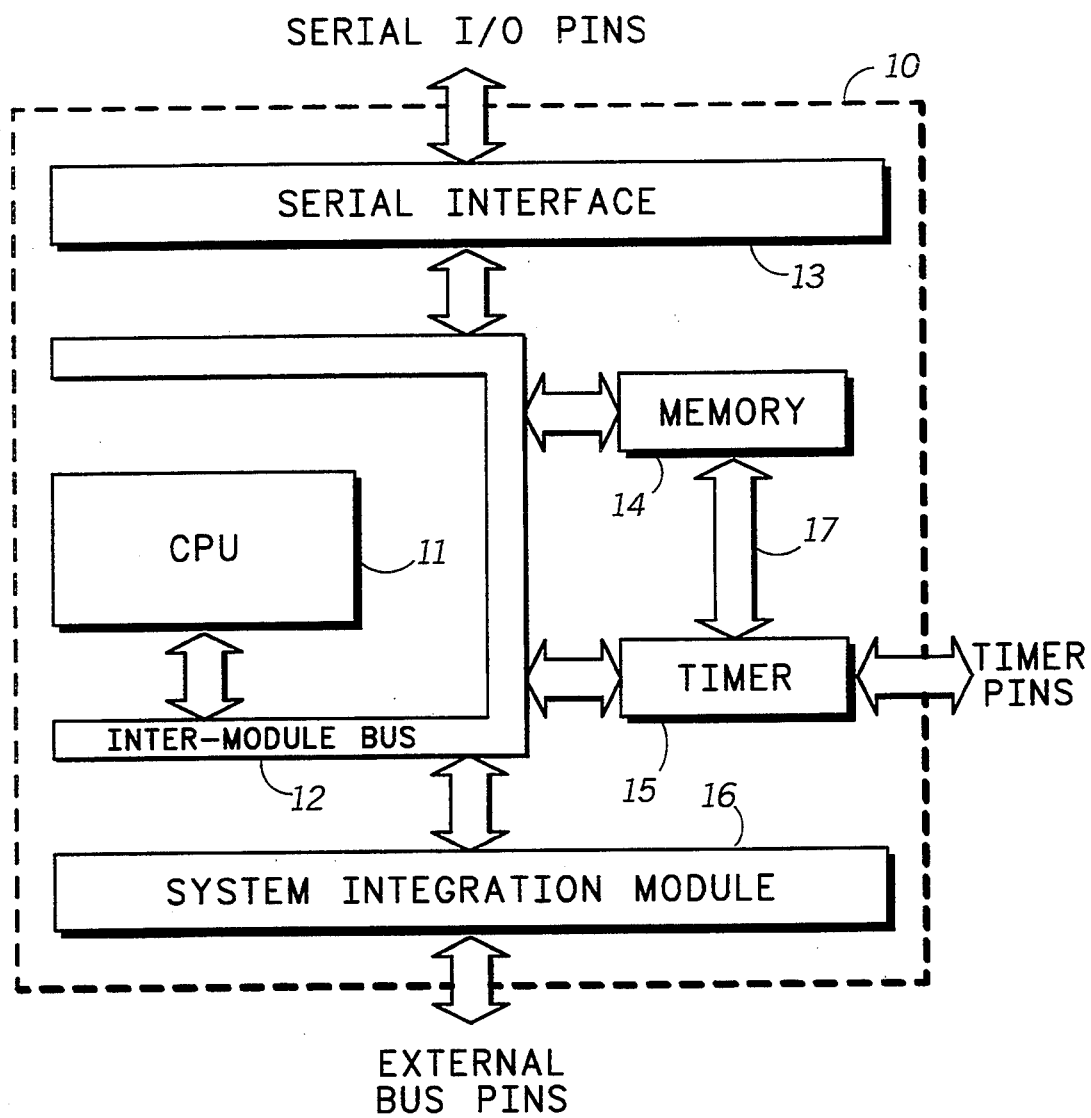
FIG. 1 is a block diagram illustrating all integrated circuit microprocessor which comprises an embodiment of the present invention.

FIG. 1 illustrates an integrated circuit microprocessor according to a particular embodiment of the present invention. A microprocessor 10 comprises a central processing unit (CPU) 11, an inter-module bus (IMB) 12, a serial communication interface 13, on-board memory 14, a timer module 15 and a system integration module (SIM) 16. Inter-module bus 12, which comprises multiple data, address and control signal lines as described in detail below, is coupled to and provides for communication between CPU 11 and each of the other modules of microprocessor 10. Serial interface 13 provides for synchronous and/or asynchronous serial data transfer between microprocessor 10 and external devices and systems by means of several serial I/O pins. Memory 14 provides storage space for software instructions and other data useful to microprocessor 10. In this particular embodiment of the invention, memory module 14 comprises an SRAM array with standby power features. Timer module 15 provides various timing functions such as input capture, output compare and the like by means of several timer pins and is coupled to memory 14 by means of an interface 17. SIM 16 provides an interface between IMB 12 and an external bus, the details of which are discussed below, and also provides certain system functions such as clock signal generation and distribution and chip select signal generation.

Eleven pins of the external bus are also usable as chip select outputs, in which case they are referred to as CS0–CS10. Logic within SIM 16 determines whether each of these pins is to be used as a chip select output instead of performing its original function as a part of the external bus and asserts each chip select signal at appropriate times. In addition, a single pin, referred to as CSBOOT, is dedicated to performing chip select functions and is intended for use in selecting an external boot ROM.

Tables I and II below describe the signals which make up IMB 12 and the external bus, respectively.

TABLE I

INTER-MODULE BUS SIGNALS

| SIGNAL NAME | MNEMONIC | FUNCTION | DIRECTION |
| --- | --- | --- | --- |
| Address Bus | ADDR0–ADDR23 | 24 bit address bus | output |
| Data Bus | DATA0–DATA15 | 16 bit data bus capable of 8 and 16 bit transfers | input/output |
| Function Code | FC0–FC2 | Identifies CPU state (supervisor user) and address space of the current bus cycle | output |
| Clock | CLOCK | Master system clock | input |
| Cycle Start | CYS | Indicates start of internal bus cycle | output |
| Address Strobe | AS | Indicates second phase of bus cycle and that address is valid | output |
| Data Strobe | DS | Indicates third phase of bus cycle and that data is valid | output |
| Read/Write | WRITE | Defines a bus cycle as a read or write, relative to the bus master | output |
| Transfer Size | SIZ0–SIZ1 | Specifies the number of bytes yet to be transferred in a bus cycle | output |
| Data Transfer Acknowledge | DTACK | Slave response which terminates a bus cycle | input |
| Bus Error | BERR | Provides for termination of a bus cycle if no valid response is received | input |
| Relinquish and Retry | RRT | Provides a means for breaking a bus mastership standoff at the internal/external bus boundary | input |
| Retry | RETRY | Provides for termination of a bus cycle which should be rerun | input |
| Halt | HALT | Indicates that the CPU has halted due to an abnormal condition | output |
| Breakpoint Request | BKPT | Signals a request for a break-point on the current bus cycle | input |
| Breakpoint Acknowledge | FREEZE | Indicates that the CPU has entered background debug mode | output |
| System Reset | SYSRST | Provides a "soft" reset which does not disturb system configuration data | output |
| Master Reset | MSTRST | Provides a "hard" reset of everything | input |
| Interrupt Request Level | IRQ1 – IRQ7 | Prioritized interrupt requests to the CPU | input |
| Autovector | AVEC | Specifies that autovector feature is to be used during an interrupt acknowledge cycle | input |
| Bus Request | BR0 – BRn | Prioritized bus mastership arbitration signals | input |
| Bus Lock | BLOCK | Allows bus master to retain bus | output |
| Test Mode | TSTMOD | Enables test mode for all devices | input |
| Enable IMB test lines | IMBTEST | Changes function of IRQ1–IRQ7 to test lines | input |

Signal directions in Table I are specified with respect to CPU 11.

TABLE II

EXTERNAL BUS SIGNALS

| SIGNAL NAME | MNEMONIC | FUNCTION | DIRECTION |
| --- | --- | --- | --- |
| Address Bus | A0–A23* | 24 bit address bus | output |
| Data Bus | D0–D15 | 16 bit data bus capable of 8 and 16 bit transfers | input/output |
| Function Code | FC0–FC2* | Identifies CPU state (supervisor or user) and address space of current bus cycle | output |

TABLE II-continued
EXTERNAL BUS SIGNALS

| SIGNAL NAME | MNEMONIC | FUNCTION | DIRECTION |
|---|---|---|---|
| Boot Chip Select | CSBOOT | Programmable chip select for boot-up | output |
| Bus Request | BR* | Bus Mastership Request line | output |
| Bus Grant | BG* | Bus Mastership Grant Line | output |
| Bus Grant Acknowledge | BGACK* | Bus Mastership Grant Acknowledge line | input/output |
| Data and Size Acknowledge | DSACK0 - DSACK1 | Indicates that data is valid on read and that data has been received on write. Also indicates port size. | input/output |
| Read-Modify-Write Cycle | RMC | Indicates bus cycle which is part of an indivisible read-modify-write operation | output |
| Address Strobe | AS | Indicates that address, function codes, etc. are valid | output |
| Data Strobe | DS | Indicates that data is valid on write and that slave should drive data on read | output |
| Read/Write | WRITE | Defines a bus cycle as a read or write, relative to the bus master | output |
| Transfer Size | SIZ0-SIZ1 | Indicates single or multi-byte transfer | input/output |
| Bus Error | BERR | Provides for termination of a bus cycle if no valid response is received | input |
| Halt | HALT | Indicates that the CPU has halted due to an abnormal condition | input/output |
| Interrupt Request Level | IRQ1 - IRQ7 | Prioritized interrupt requests to the CPU | input |
| Autovector | AVEC | Specifies that autovector feature is to be used during an interrupt ack. cycle | input |
| Reset | RESET | System Reset | input/output |
| External System Clock | CLKOUT | External system clock -- bus clock | output |
| Crystal Osc. | EXTAL XTAL | Pins for connection of external oscillator or clock circuit | input output |
| External Filter Capacitor | XFC | Allows connection of an external filter capacitor to internal clock circuit | input |
| Synthesizer Power Supply | $VDD_{SYN}$ | Provides power to internal clock synthesizer | input |
| Main Power Supply | $V_{DD}$ | Provides power to chip | input |
| Freeze | FRZ/QUOT | Acknowledges entry into background mode and outputs quotient bits in test mode | output |
| Test Mode and Enable and Tri-State Control | TSTME/TSC | Enables test mode or causes output drivers to be tri-stated | input |
| Clock Mode Select | MODCK | Selects source of system clock | input |

Signal directions in Table II are specified with respect to microprocessor 10 and assume that the external bus is in its master mode. The external bus also operates in a slave mode in which many of the the signal directions are reversed. The pins denoted above with an asterisk, the address pins A19-A23, the function code pins FC0-FC2, the bus request pin BR, the bus grant pin BG and the bus grant acknowledge pin BGACK, may also be used as programmable chip select pins. In addition, the CSBOOT pin is a dedicated chip select pin intended to select a boot ROM during the start-up sequence of microprocessor 10.

To those familiar with 68000-family microprocessor products available from Motorola. Inc., the signals described in Table II will be generally familiar. The external bus is basically an asynchronous bus with a 16 bit data bus. The bus supports cycle-by-cycle dynamic bus sizing (using the DSACKx cycle termination signals); operand transfers of one, two three and four bytes (using the SIZx signals); bus mastership arbitration (using the BR, BG and BGACK signals); a 7-level interrupt priority and arbitration scheme (using the IRQx signals) and autovectored interrupts (using the AVEC signal). This is a relatively sophisticated bus. Many commonly available peripherals do not have the capability to generate and/or respond to all of the control signals necessary to interface to this bus.

Referring now to FIGS. 2A-2D, the registers of SIM 16 which are relevant to the chip select logic are described. The registers of FIGS. 2A-2D all reside in the memory map of microprocessor 10 and are accessible by CPU 11 or another bus master. Physically, these registers are located within SIM 16 in this particular embodiment of the invention.

Two chip select pin assignment registers 20 and 21 (also referred to as CSPAR0 and CSPAR1, respectively) contain 16, two-bit fields. Twelve of these fields correspond to the twelve chip select outputs (CS0-CS10 and CSBOOT) which SIM 16 is capable of producing. Each of the chip select outputs, except CSBOOT, shares a pin of microprocessor 10 with some other function or functions. Therefore, each two-bit field determines the use of those shared pins. For instance, one of the chip select outputs, CS0, shares a pin with the Bus Request (BR) signal of the external bus. In some cases (CS3-CS9), the pins can also be used as discrete digital output pins. Table III below summarizes the encodings of the two-bit fields of CSPAR0 and CSPAR1.

TABLE III

| BITS | | DESCRIPTION |
|---|---|---|
| MSB | LSB | OF FUNCTION |
| 0 | 0 | Discrete Output (E clock on A23) |

TABLE III-continued

| BITS | | DESCRIPTION |
|---|---|---|
| MSB | LSB | OF FUNCTION |
| 0 | 1 | Original Function |
| 1 | 0 | Chip Select: 8 Bit Port |
| 1 | 1 | Chip Select: 16 Bit Port |

The term Original Function in Table III refers to those functions listed in parentheses in the CSPAR0 and CSPAR1 registers of FIGS. 2A-2D. Discrete Output refers to the fact that some of the pins assigned to chip select functions (FC0-FC2 and A19-A22) may also be used as an output-only port referred to as Port C. The data to be output is contained in a Chip Select Pin Data Register (CSPDR) which is not illustrated. The E clock refers to a bus control timing signal familiar to users of the industry standard Motorola 6800-family bus. SIM 16, which generates all of the clock signals for microprocessor 10, is capable of generating an E clock signal and of synchronizing cycles of the external bus thereto, in which case the pin normally used by the most significant address signal, A23, is used to provide the E clock output. The 8 or 16 port size designation refers to the fact that peripheral devices having either byte- or word-size data buses can be accommodated.

SIM 16 also includes a set of twelve base address registers 22, also referred to as CSBRBT and CSBR0-CSBR10. Each base address register corresponds to one of the twelve chip select outputs and determines the range of addresses for which that chip select is to be active. Bits 3-15 comprise a base address bit field and bits 0-2 comprise a block size bit field. Table IV below describes the encodings of the bits of the block size bit field.

TABLE IV

| BITS | | | BLOCK SIZE | ADDRESS LINES |
|---|---|---|---|---|
| 2 | 1 | 0 | (BYTES) | COMPARED |
| 0 | 0 | 0 | 2K | ADDR11-ADDR23 |
| 0 | 0 | 1 | 8K | ADDR13-ADDR23 |
| 0 | 1 | 0 | 16K | ADDR14-ADDR23 |
| 0 | 1 | 1 | 64K | ADDR16-ADDR23 |
| 1 | 0 | 0 | 128K | ADDR17-ADDR23 |
| 1 | 0 | 1 | 256K | ADDR18-ADDR23 |
| 1 | 1 | 0 | 512K | ADDR19-ADDR23 |
| 1 | 1 | 1 | 1M | ADDR20-ADDR23 |

The third column of Table IV sets out which bits of the address for a particular bus cycle are compared to the base address bits of the base address register in order to determine whether the bus cycle falls within the address range for which the particular chip select output is to be active. Of course, as the block size increases, fewer address bits need to be compared and the least significant bits of the base address field are ignored.

As is very familiar to users of Motorola 68000-family microprocessors, the address space of CPU 11 is divided into several logically separate spaces. The function code signals FC0-FC2 distinguish each bus cycle as being directed to one of these address spaces, as set forth in Table V below, and provide information regarding the current operating mode of CPU 11.

TABLE V

| FC2 | FC1 | FC0 | ADDRESS SPACE |
|---|---|---|---|
| 0 | 0 | 0 | UNDEFINED |
| 0 | 0 | 1 | USER DATA |
| 0 | 1 | 0 | USER PROGRAM |
| 0 | 1 | 1 | UNDEFINED |

TABLE V-continued

| FC2 | FC1 | FC0 | ADDRESS SPACE |
|---|---|---|---|
| 1 | 0 | 0 | UNDEFINED |
| 1 | 0 | 1 | SUPERVISOR DATA |
| 1 | 1 | 0 | SUPERVISOR PROGRAM |
| 1 | 1 | 1 | CPU |

A control bit residing in the status register of CPU 11 determines whether CPU 11 is in a user or supervisor mode and, thereby, whether user or supervisor spaces are being accessed. The current mode (user or supervisor) is also referred to the privilege state of CPU 11. CPU space bus cycles are special cycles in that address lines are used to convey information regarding the type of CPU space cycle being run, as opposed to identifying an address space location being accessed. Three CPU space cycles are defined for CPU 11: breakpoint acknowledge, interrupt acknowledge and special register access. The values of the address lines ADDR-16-ADDR19 distinguish between the different types of CPU space cycles and the remainder of the address lines carry information such as the priority level of the interrupt which is being acknowledged, the identity of the special register being accessed and the like. If a particular chip select is intended to be active during a CPU space cycle, such as may be the case for an interrupt acknowledge cycle, then each of the base address bits must be identical to the address which will be generated during the CPU space cycle. The block size bits for such a chip select should be set to 000 (block size 2K) to ensure that address lines 11-23 are compared.

SIM 16 also includes a set of twelve option registers 23, also referred to as CSORBT and CSOR0-CSOR10. Each option register corresponds to one of the twelve chip select outputs and determines the precise conditions under which the particular chip select is to be active. It is primarily the bit fields of option registers 23 which provide the flexibility of the chip select logic of the present invention.

Bit 15 of each option register is referred to with the mnemonic MODE and determines whether the bus cycle during which the particular chip select is to be active is a synchronous or an asynchronous cycle. As is described in greater detail below, the external bus is normally an asynchronous bus, but it is also capable of executing bus cycles which are synchronized to the E-clock signal. If MODE is set (equal to 1), then the particular chip select is asserted (if the address range and other options are matched) with timing appropriate for a synchronous-bus peripheral. If MODE is clear (equal to 0), then the particular chip select is asserted with timing determined by the STRB bit.

The bit field comprising bits 13 and 14 of each option register is referred to with the mnemonic BYTE and determines, if the particular chip select is configured for a 16 bit port, how the chip select is to behave during byte-wide (8 bit) accesses. In addition, the BYTE bit field can be used to disable a particular chip select. Table VI below sets forth the encodings of the bits of the BYTE bit field.

TABLE VI

| BITS | | DESCRIPTION |
|---|---|---|
| 14 | 13 | OF FUNCTION |
| 0 | 0 | DISABLE |
| 0 | 1 | LOWER BYTE ONLY |
| 1 | 0 | UPPER BYTE ONLY |

TABLE VI-continued

| BITS | | DESCRIPTION |
|---|---|---|
| 14 | 13 | OF FUNCTION |
| 1 | 1 | BOTH BYTES |

If the BYTE bits are configured to disable a particular chip select, then neither the chip select signal nor any of the internal signals which may be asserted by the chip select logic will be asserted at any time. If the bits are configured as LOWER BYTE ONLY, then the chip select signal will be active only while the lower (odd) byte of a byte-size access to the 16 bit port is being addressed. Similarly, if the bits are configured as UPPER BYTE ONLY, then the chip select signal will be active only while the upper (even) byte is being accessed. The chip select logic can always determine which byte is being accessed by examining the ADDR0, SIZ0 and SIZ1 lines of IMB 12. If ADDR0 is inactive, then the upper byte is being accessed. If ADDR0 is active, SIZ0 is active and SIZ1 is inactive, then the lower byte is being accessed. This feature allows byte-wide peripherals to be connected to either the upper or lower half of the data bus.

The bit field comprising bits 11 and 12 of each option register are referred to with the mnemonic R/W and determine whether the particular chip select signal is to be active only during read cycles, only during write cycles, or during both read and write cycles. Table VII below sets forth the encodings of the bits of the R/W bit field.

TABLE VII

| BITS | | DESCRIPTION |
|---|---|---|
| 12 | 11 | OF FUNCTION |
| 0 | 0 | RESERVED |
| 0 | 1 | READ CYCLES ONLY |
| 1 | 0 | WRITE CYCLES ONLY |
| 1 | 1 | READ AND WRITE CYCLES |

Bit 10 of each option register, which is referred to with the mnemonic STRB, determines, if MODE is clear, whether the particular chip select is to be active synchronized with the address strobe signal ($\overline{AS}$) or the data strobe signal ($\overline{DS}$) of the external bus. The chip select is synchronized to $\overline{AS}$ if the STRB bit is clear (equal to 0) and is synchronized to $\overline{DS}$ is the STRB bit is set (equal to 1). This feature accommodates peripherals which require various timing of chip select signals.

The bit field comprising bits 6–9 of each option register is referred to with the mnemonic DSACK and determines whether the chip select logic for a particular chip select signal will generate the cycle-terminating $\overline{DSACKx}$ external bus control signal and when that signal will be generated. Normally, the external bus control logic expects any peripherals connected to the external bus to be capable of generating appropriate $\overline{DSACKx}$ control signals to terminate a bus cycle and support cycle-by-cycle dynamic bus sizing. This bit field provides the ability to interface to peripherals without this capability by instructing the chip select logic itself to generate the appropriate control signals and to program wait states into external bus cycles on a device-by-device basis, so that external accesses are optimized. The insertion of wait states will be described more fully below. Table VIII below sets forth the encodings of the bits of the DSACK bit field.

TABLE VIII

| BITS | | | | DESCRIPTION |
|---|---|---|---|---|
| 9 | 8 | 7 | 6 | |
| 0 | 0 | 0 | 0 | NO WAIT STATE |
| 0 | 0 | 0 | 1 | 1 WAIT STATE |
| 0 | 0 | 1 | 0 | 2 WAIT STATES |
| 0 | 0 | 1 | 1 | 3 WAIT STATES |
| 0 | 1 | 0 | 0 | 4 WAIT STATES |
| 0 | 1 | 0 | 1 | 5 WAIT STATES |
| 0 | 1 | 1 | 0 | 6 WAIT STATES |
| 0 | 1 | 1 | 1 | 7 WAIT STATES |
| 1 | 0 | 0 | 0 | 8 WAIT STATES |
| 1 | 0 | 0 | 1 | 9 WAIT STATES |
| 1 | 0 | 1 | 0 | 10 WAIT STATES |
| 1 | 0 | 1 | 1 | 11 WAIT STATES |
| 1 | 1 | 0 | 0 | 12 WAIT STATES |
| 1 | 1 | 0 | 1 | 13 WAIT STATES |
| 1 | 1 | 1 | 0 | FAST TERMINATION |
| 1 | 1 | 1 | 1 | EXTERNAL DSACK |

The normal external bus cycle is an asynchronous cycle which is terminated with the assertion of $\overline{DSACKx}$ by the peripheral device being accessed. It is considered to be a normal cycle if three complete clock cycles (six clock states, or tics) are required to complete the bus cycle. If no $\overline{DSACKx}$ signal has been asserted by the end of the first half of the second clock cycle (the third clock state) then wait states are inserted in the bus cycle by the bus controller until the peripheral asserts appropriate $\overline{DSACKx}$ signals. As mentioned above, the chip select logic is capable of generating the required cycle termination signals, with appropriate timing as required by the peripheral, so as to permit the use of simpler peripherals without the use of glue logic. Of course, if the external peripheral is capable of generating the cycle terminating signals, then the DSACK bit field can be set to all 1's. If the external peripheral is capable of responding to a bus cycle in fewer than three clock cycles, the DSACK bit field may be set to 1110, which indicates a fast termination.

A bus cycle terminated by the chip select logic in response to the fast termination setting of the DSACK bit field is, in some sense, a synchronous cycle. This is not the same as the synchronous mode selected by bit 15 of the option registers. On such bus cycles, the chip select logic asserts $\overline{DSACKx}$ during the second half of the first clock cycle of the bus cycle. The peripheral must have the data ready and on the bus (on a read cycle) or be prepared to latch the data from the bus (on a write cycle) by the falling edge of the first half of the second clock cycle of the bus cycle. The cycle is terminated at the end of the second clock cycle of the bus cycle.

The chip select logic asserts appropriate $\overline{DSACKx}$ signals to support dynamic bus sizing in accordance with the current configuration of the particular chip select to support an 8 or 16 bit port. That is if the chip select is configured to support an 8 bit port, DSACK1 is 1 and DSACK0 is zero. If configured to support a 16 bit port, DSACK1 is 0 and DSACK0 is a "don't care".

The bit field comprising bits 4 and 5 of each option register is referred to with the mnemonic SPACE and determines in which of the several address spaces of CPU 11 the particular chip select is intended to be active. Table IX below sets forth the encodings of the bits of the SPACE bit field.

TABLE IX

| BITS | | ACTIVE SPACE |
|---|---|---|
| 5 | 4 | |
| 0 | 0 | CPU SPACE |
| 0 | 1 | USER SPACE ONLY |
| 1 | 0 | SUPERVISOR SPACE ONLY |
| 1 | 1 | SUPERVISOR/USER SPACES |

In a sense, the address space of a bus cycle conveys information regarding the operating mode of the bus master (in this case, CPU 11). For instance, supervisor space is normally used for protected code such as an operating system whereas user space is used for normal applications. More importantly, the CPU space is used only for "special" bus cycles, as described above, which indicate that the bus master has or is about to suspend normal program execution and is operating in response to some type of exception or unusual circumstance. Thus, the ability to assert a particular chip select based upon the address space of the bus cycle provides significant flexibility in interfacing peripherals which only need to be active in certain circumstances.

A particular instance of a CPU space cycle is an interrupt acknowledge cycle. Microprocessor 10 implements a 7 level interrupt priority scheme using the IRQ-1–IRQ7 lines of the IMB 12 and the external bus to identify the priority level of an interrupt request, a three-bit interrupt mask residing in the status register of CPU 11 to determine which interrupts will be acknowledged and an interrupt acknowledge bus cycle (a CPU space cycle) to acknowledge interrupt requests and arbitrate among competing requests. During the interrupt acknowledge cycle, CPU 11 places the level of the interrupt request being acknowledged on address lines ADDR1–ADDR3. During this cycle, the requesting peripheral must either place an interrupt vector (the memory address at which the starting address of its interrupt service routine is stored) on the data bus or assert the autovector (AVEC) signal.

The bit field comprising bits 1–3 of each option register is referred to with the mnemonic IPL and determines for which interrupt priority level the particular chip select will be active during an interrupt acknowledge cycle. The chip select logic for a particular chip select signal will assert the chip select signal only for particular values of ADDR1–ADDR3 according to the settings of the IPL bit field. Table X below sets forth the encodings of the IPL bit field.

TABLE X

| BITS | | | LEVEL MATCHED |
|---|---|---|---|
| 3 | 2 | 1 | |
| 0 | 0 | 0 | ANY LEVEL |
| 0 | 0 | 1 | LEVEL 1 |
| 0 | 1 | 0 | LEVEL 2 |
| 0 | 1 | 1 | LEVEL 3 |
| 1 | 0 | 0 | LEVEL 4 |
| 1 | 0 | 1 | LEVEL 5 |
| 1 | 1 | 0 | LEVEL 6 |
| 1 | 1 | 1 | LEVEL 7 |

If the IPL bit field is all 0's, then the chip select will be active during interrupt acknowledge cycles, regardless of the interrupt priority level being acknowledged. Otherwise, the chip select will be active only if the interrupt priority level being acknowledged matches that of the IPL bit field. As is apparent, in order to support interrupt priority level checking, a chip select must be configured to be active during CPU space cycles.

Finally, bit 0 of each option register is referred to with the mnemonic AVEC and determines whether the chip select logic for a particular chip select signal will assert the $\overline{AVEC}$ control signal during an interrupt acknowledge cycle to indicate that CPU 11 should use an internally-generated interrupt vector. If the AVEC bit is clear, the $\overline{AVEC}$ signal will not be asserted and the interrupt vector must be supplied by the device which produced the acknowledged interrupt request. If the AVEC bit is set, the $\overline{AVEC}$ control signal is generated by the chip select logic during the interrupt acknowledge cycle. This feature permits the interfacing of peripherals which include neither the capability to respond to an interrupt acknowledge cycle by producing an interrupt vector nor the capability to respond by providing the $\overline{AVEC}$ signal.

Figure 3:
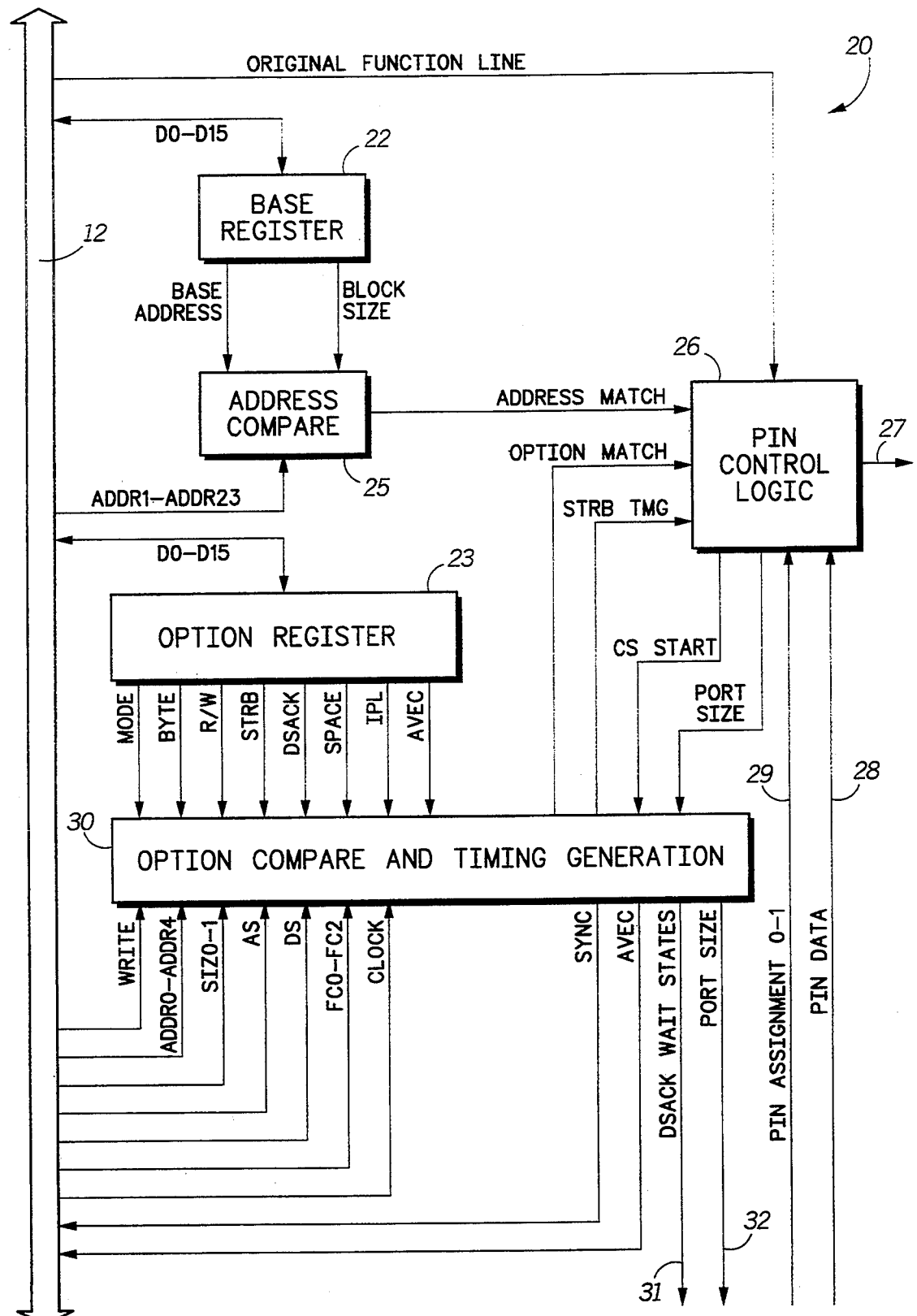
FIG. 3 is a block diagram illustrating a portion of the chip select logic of the apparatus of FIG. 1.

Referring now to FIG. 3, chip select logic 20 is illustrated in block diagram form. The illustrated chip select logic 20 is sufficient to produce 1 of the 12 chip select signals described above. Thus, chip select logic 20 is repeated 12 times in microprocessor 10. Base address register 22 is connected bi-directionally to the data lines of IMB 12 and, although it is not illustrated here, through a decoder to the address lines of IMB 12 to provide for read and write access to the register. The base address and block size bit fields of base address register 22 are provided as inputs to an address comparator 25. Address comparator 25 is also connected to address lines ADDR11–ADDR23 of IMB 12. Address comparator 25 performs the address comparison described above and produces an address match output signal which is active when the address of the current cycle of IMB 12 falls within the range specified by the contents of base address register 22. The address match output of address comparator 25 is connected as an input to pin control logic 26. Pin control logic 26 is connected to and controls the state of pin 27.

Pin control logic 26 is also coupled to a line of IMB 12 which is labelled here the "original function line". If, for instance, chip select logic 20 corresponds to the chip select pin CS3, then the "original function line" is the function code line FC0. See the chip select pin assignment registers illustrated in FIGS. 2A–2D for the complete correspondence between the chip select pins and their original functions.

In the case of 7 of the 12 chip select outputs (CS3–CS9), pin control logic 26 is also coupled to a port data register via a line 28. These pins can also be used as discrete digital outputs. The data for each pin, when used in this mode, is provided from the port data register via line 28.

Pin control logic 26 is also connected to the appropriate bit field of one of the two chip select pin assignment registers via a pair of lines 29. Pin control logic 26 determines, according to the encodings set forth in TABLE III, which function is to be implemented at pin 27.

Option register 23 is connected bi-directionally to the data lines of IMB 12 and, although it is not illustrated here, through a decoder to the address lines of IMB 12 to provide for read and write access to the register. The eight bit fields of option register 23 are provided as inputs to option compare and timing generation logic 30. Logic 30 also receives as inputs the $\overline{WRITE}$, ADDR0–ADDR4, SIZ0–SIZ1, $\overline{AS}$, $\overline{DS}$, FC0–FC2 and CLOCK signals of IMB 12. From pin control logic 26, option compare and timing generation logic 30 receives as inputs a PORT SIZE signal and a CS START signal. The PORT SIZE signal indicates whether this particular chip select is configured for an 8-bit or a 16-bit port by its pin assignment register bit field.

Option compare and timing generation logic 30 produces OPTION MATCH and STRB TMG output signals which are connected as inputs to pin control logic 26. The OPTION MATCH signal, when active, indicates that conditions for assertion of this particular chip select signal, as encoded in the bit fields of option register 23, are matched by the current cycle of IMB 12 and that, therefore, that pin control logic 26 should assert the chip select signal. The STRB TMG signal indicates to pin control logic 26 when the selected one of the $\overline{AS}$ and $\overline{DS}$ is active so that pin control logic 26 can appropriately time the assertion of the chip select signal.

Option compare and timing generation logic 30 also produces output signals labelled DSACK WAIT STATES and PORT SIZE on lines 31 and 32, respectively. Lines 31 and 32 are connected as inputs to logic located elsewhere within SIM 16 which is capable of generating the $\overline{DSACKx}$ signals which cause the termination of external bus cycles. These output signals are produced in accordance with the states of the bits of the DSACK and BYTE bit fields of option register 23 and enable the DSACK generation logic to either allow the external device to generate the appropriate cycle termination signals or to generate them internally, after the appropriate number of wait states have been inserted.

Option compare and timing generation logic 30 also produces the $\overline{AVEC}$ signal of IMB 12, in accordance with the state of the AVEC bit field of option register 23, in order to specify that the autovector feature of CPU 11 be used for a particular interrupt acknowledge cycle.

Finally, option compare and timing generation logic 30 produces a SYNC signal, in accordance with the state of the MODE bit field of option register 23, to indicate if the current external bus cycle is to be synchronous. This signal is used by the external bus controller to set up for a synchronous external cycle.

Figure 4A:
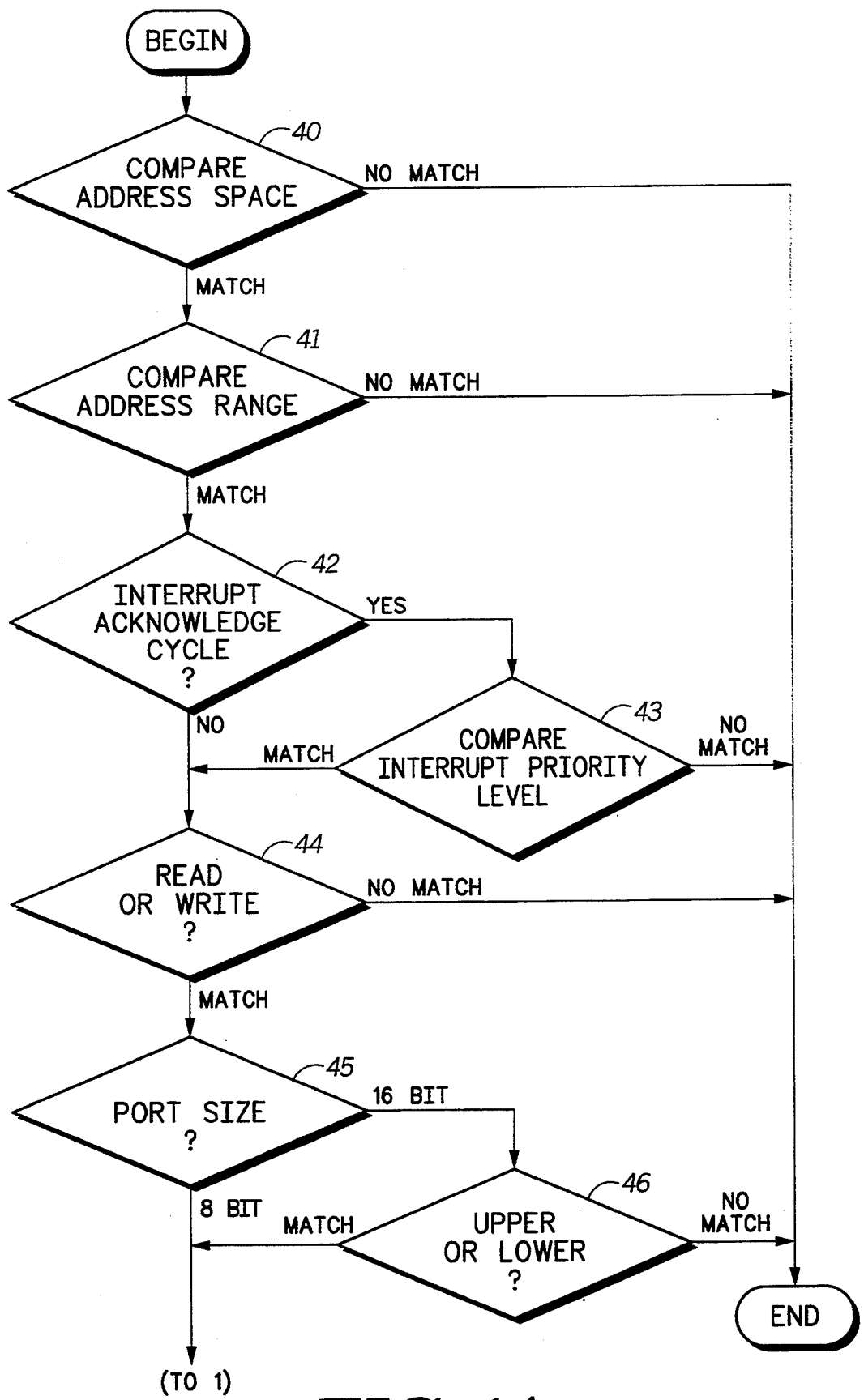
FIG. 4A is a first, portion of a flow chart illustrating a sequence of steps performed by the apparatus of FIGS. 1-3.
Figure 4B:
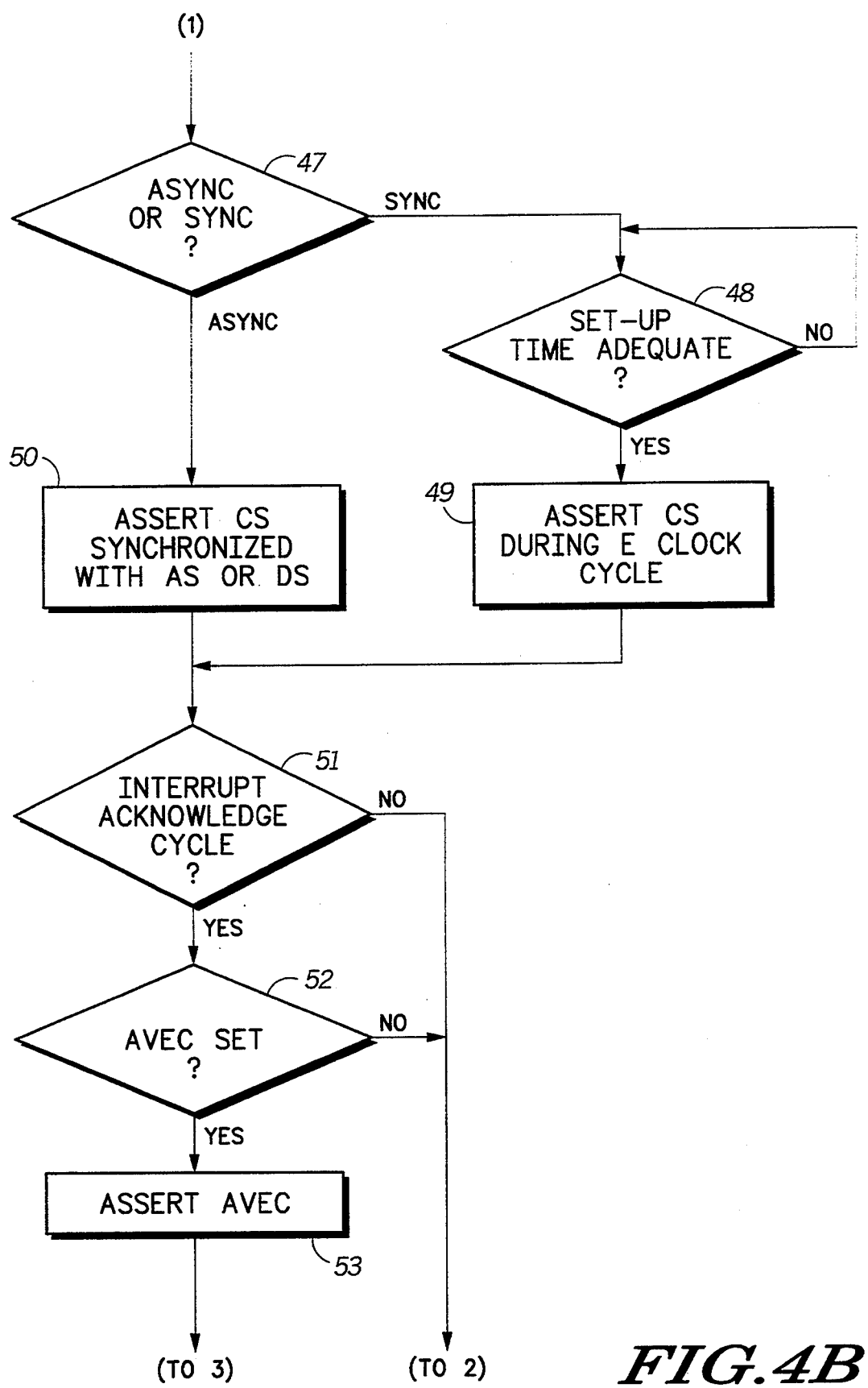
FIG. 4B is a second portion of a flow chart illustrating a sequence of steps performed by the apparatus of FIGS. 1-3.
Figure 4C:
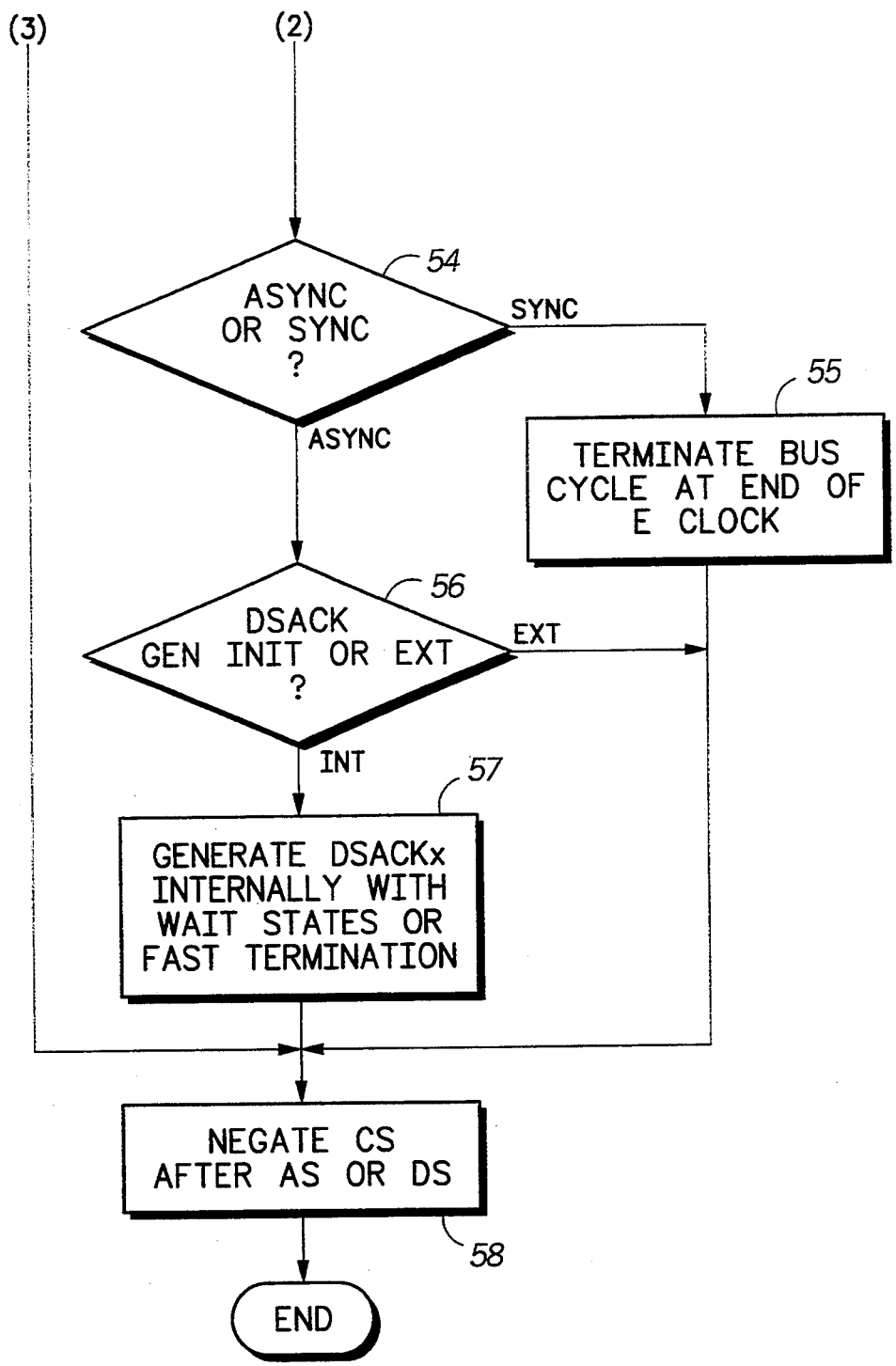
FIG. 4C is a third portion of a flow chart illustrating a sequence of steps performed by the apparatus of FIGS. 1-3.

Referring now to FIGS. 4A–4C, a flowchart illustrating the process by which the apparatus of FIG. 3 determines whether to assert a particular chip select on a particular bus cycle is described. The flowchart assumes that the pin is configured as a chip select; that is, that the most significant bit of the chip select pin assignment register bit field for this pin is set to 1. The process illustrated is carried out once for each cycle of the external bus.

First, at 40, the address space (FC0–FC2) of the current bus cycle is compared to the SPACE bit field of option register 23. If there is a match, the process proceeds. If not, the chip select assertion process terminates for this bus cycle. Next, at 41, the address of the current bus cycle is compared to the address range specified by the base address and block size bit fields of base address register 22. If there is a match, the process proceeds. If not, the chip select assertion process terminates for this bus cycle. Next, at 42, a determination is made as to whether the current bus cycle is an interrupt acknowledge cycle. An interrupt acknowledge cycle is a CPU space cycle in which the address lines A16–A19 are all set to 1. If this is an interrupt acknowledge cycle, a comparison is made, at 43, between the interrupt priority level being acknowledged, which appears on address lines A1–A3, and the IPL bit field of option register 23. If there is a match, the process proceeds. If not, the chip select assertion process terminates for this bus cycle.

Next, at 44, a determination is made as to whether the current bus cycle is a read cycle or a write cycle by examining the state of the $\overline{WRITE}$ control signal. If there is a match between the current bus cycle and the R/W bit field of option register 23, the process proceeds. If not, the chip select assertion process terminates for this bus cycle. Next, at 45, the port size of this chip select, as specified by the least significant bit of the chip select pin assignment register bit field for this chip select, is examined. If this chip select is configured for an 8 bit port, the chip select process proceeds. If set for a 16 bit port, then, at 46, the least significant address line, A0, and the SIZ0 and SIZ1 lines are examined to determine whether the current cycle is accessing the upper or lower byte of the port. If the byte being accessed does not match the setting of the BYTE field of option register 23 the chip select process terminates. Otherwise, the process continues.

Next, at 47, the MODE bit field of option register 23 is examined to determine whether the external bus cycle is to be a normal, asynchronous cycle or is to run as a synchronous cycle in order to accommodate an older, 6800-family peripheral. If it is to be an asynchronous cycle, the chip select assertion process continues with the assertion, at 50, of the chip select signal at the appropriate time during the external bus cycle as determined by the state of the STRB bit field of option register 23. If it is to be a synchronous cycle, then, at 48, a determination is made as to whether there is sufficient time before the next E-clock cycle to set up the external bus cycle. If not, the internal bus cycle is stretched by the addition of wait states and the external bus cycle is held off until the following E-clock cycle. When there is sufficient set-up time then, at 49, the chip select signal is asserted at the appropriate time during the E-clock cycle.

Once again, at 51, a determination is made as to whether the current cycle is an interrupt acknowledge cycle. If not, then the chip select assertion process continues. If it is an interrupt acknowledge cycle, then, at 52, the AVEC bit field of option register 23 is checked. If AVEC is clear (equal to 0), then the process continues. If AVEC is set, then, at 53, the chip select logic asserts the $\overline{AVEC}$ signal of IMB 12 to trigger the autovector process within CPU 11.

Next, assuming that no autovectoring has taken place, the ASYNC/SYNC determination is repeated at 54 for purposes of cycle termination. If the cycle is synchronous, it terminates automatically, at 55, at the end of the E-clock cycle. If the cycle is asynchronous, then, at 56, the DSACK bit field of option register 23 is examined. If the DSACK bit field is programmed for an externally-generated cycle termination signal, then the process proceeds without further action until the addressed peripheral produces that signal. If, however, the DSACK bit field specifies an internally-generated cycle termination signal, then the chip select logic will cooperate with the internal DSACK generator, at 57, to produce the required cycle termination signal at the appropriate time.

Finally, at 58, the chip select signal is negated with appropriate timing with regard to the $\overline{AS}$ or $\overline{DS}$ signal and the chip select assertion process for the current bus cycle is complete.

Each of the bit fields of the registers of FIGS. 2A–2D has default values which apply as microcomputer 10 comes out of reset. In other words, while microcomputer 10 is in a reset condition, each of the bit fields is set to certain values, some of which are predetermined and some of which are determined by external conditions which exist during reset. These values determine the chip select configuration which will apply until a user-provided program changes the values by writing to the registers of FIGS. 2A–2D. Most significantly, the CSBOOT chip select comes out of reset configured to select a memory containing boot code (commonly referred to as boot ROM), but can still be re-programmed to serve another purpose after the boot process is complete.

The most significant bit of the CSBOOT field of CSPAR0 is set to 1 following a reset, thus configuring the CSBOOT pin as a chip select. The value of the least significant bit of the CSBOOT field is determined by the state of the least significant bit line of the external data bus, D0, which is latched prior to exit from reset. This and the other data lines include a weak internal pull-up device which is active during reset, so the data line and the least significant bit of CSBOOT will be set to 1 if no external device pulls the line low during reset. Thus, the default state for CSBOOT is to be configured for a 16-bit port.

The least significant bits of each of the other fields of CSPAR0, and of CSPAR1, are set to 1 following a reset. The values of the most significant bits of each of these fields are determined by the values of the external data bus lines D2–D7. The state of D1 following reset determines the states of the most significant bits of the CS0, CS1 and CS2 fields of CSPAR0. The state of D2 following reset determines the states of the most significant bits of the CS3, CS4 and CS5 fields of CSPAR0. Finally, the states of D3–D7 following reset determine the states of the most significant bits of the CS6–CS10 fields of CSPAR1 as follows: D3 corresponds to CS6, D8 corresponds to CS7 and so on; and if any of D3–D7 is pulled low following reset the most significant bit of the corresponding field of CSPAR1 and the most significant bit of all the lower-order fields of CSPAR1 will be cleared. In other words, if D6 is pulled low following reset, the most significant bits of the CS9, CS8, CS7 and CS6 fields of CSPAR1 will all be cleared. As mentioned above, all of these data lines have internal pull-up devices, so the default state is high. Therefore, the chip selects CS0–CS10 come out of reset configured either as "original function" or as a 16-bit port chip select, depending on the state of the corresponding data line following reset.

All bits of the base address registers (CSBR0–CSBR10) and option registers (CSOR0–CSOR10) for chip selects CS0–CS10 are cleared to all 0's following reset. Note that since this places a value of 00 in the BYTE bit fields for each of CS0–CS10, each of these chip selects will be disabled immediately following reset. User-supplied code executed following reset must configure these chip selects as desired and enable them.

For CSBOOT, the BASE ADDRESS field is cleared to all 0's, since the reset vector of CPU 11 (the location at which CPU 11 expects to find the address of the first instruction to be executed following reset) is 000 0000 (hex). The BLOCK SIZE field for CSBOOT is set to all 1's, the MODE bit is cleared to 0, the BYTE field is set to all 1's, the R/W field is set to all 1's, the STRB bit is 1, the DSACK field is 1101, the SPACE field is set to all 1's, the IPL field is cleared to all 0's and the AVEC bit is cleared to 0. These default values provide a chip select signal which is appropriate for selecting a read-only memory device from which the reset vector, and perhaps some boot code, can be retrieved. Note, however, that the port size which the CSBOOT chip select will support is programmable during reset and that this chip select pin can be re-configured following its use to select the boot ROM to perform some other chip select function.

The disclosed apparatus provides an improved integrated circuit microprocessor with chip select logic. The combination of programmable options produces significantly greater flexibility to a system designer than has been the case with previous chip select units. The designer can use various combinations of these options to produce nearly any required control signal for a wide range of peripheral devices. In addition, the disclosed chip select logic provides a pre-programmed chip select pin which is suitable for selecting an external memory which contains boot code, but allows this chip select pin to be re-programmed for another use after the boot process is complete.

Among the features disclosed are: the ability to program a chip select pin to be active on read cycles only, write cycles only or either type of cycle; the ability to program a chip select pin to be synchronized to either a data strobe signal or an address strobe signal; the ability to program a chip select signal to be selectively active only while the bus master (CPU 11 in this case) is in a particular operating mode; the ability to program a chip select pin to be active only if the interrupt priority level of an interrupt acknowledge bus cycle matches a programmed value; the ability to program a chip select pin to provide an autovector control signal to the bus master during an interrupt acknowledge cycle; the ability to program a chip select pin to appropriately support both 8 and 16 bit ports and byte-wide accesses to a 16 bit port; the ability to have a particular chip select pin configured to select a boot ROM immediately following reset but still allow some configuration of that chip select pin during reset and also allow re-programming of that chip select pin after its use as a boot ROM select pin is no longer needed; and the ability to program a chip select pin to assert synchronous (fast) termination of a bus cycle but still support dynamic bus sizing.

A number of potential modifications to the disclosed embodiment will be apparent to those skilled in the art. For instance, the choice of the default values for the various chip select control register fields is subject to many possible variations. The method used to determine the reset states of the pin assignment bit fields (latching the state of external pins) might be varied. And the size, location and assignment of the various control bit fields could be altered. These and other objects and advantages of the present invention are within the spirit and scope of the attached claims.

We claim:

1. An integrated circuit microprocessor comprising:
   a central processing unit;
   bus controller means coupled to the central processing unit and to a plurality of pins of the integrated circuit microprocessor for operating a bus external to the integrated circuit microprocessor; and
   chip select means coupled to the central processing unit and to a pin of the integrated circuit microprocessor for selectively providing, under control of the central processing unit, a chip select signal to a device external to the microprocessor;

wherein the improvement comprises:

a chip select control register means coupled to the chip select means and to the central processing unit for storing, under control of the central processing unit, a first bit field; and the chip select means is responsive to the states of the bits of the first bit field of the chip select control register means to selectively assert the chip select signal only while the bus controller means is executing a write cycle of the bus, only while the bus controller is executing a read cycle of the bus or while the bus controller is executing either a read cycle or a write cycle of the bus.

2. An integrated circuit microprocessor according to claim 1 wherein the improvement further comprises:

the chip select control register means also stores, under control of the central processing unit, a second bit field; and the chip select means is responsive to the states of the bits of the second bit field of the chip select control register means to selectively assert the chip select signal synchronized with a data strobe signal of the bus or synchronized with an address strobe signal of the bus.

3. An integrated circuit microprocessor according to claim 1 wherein the improvement further comprises:

the chip select control register means also stores, under control of the central processing unit, a third bit field; and the chip select means is responsive to the states of the bits of the third bit field of the chip select control register means to selectively assert the chip select signal dependent upon an operating mode of the central processing unit.

4. An integrated circuit microprocessor according to claim 1 wherein the improvement further comprises:

the chip select control register means also stores, under control of the central processing unit, a fourth bit field; and the chip select means is responsive to the states of the bits of the fourth bit field of the chip select control register means to selectively assert the chip select signal during an interrupt acknowledge cycle of the bus only if an interrupt level of the interrupt acknowledge cycle bears a predetermined relationship to the fourth bit field.

5. An integrated circuit microprocessor according to claim 4 wherein the improvement further comprises:

the chip select control register means also stores, under control of the central processing unit, a fifth bit field; and the chip select means is responsive to the states of the bits of the fifth bit field of the chip select control register means to selectively provide an autovector signal to the central processing unit.

6. An integrated circuit microprocessor according to claim 1 wherein the improvement further comprises:

reset means for resetting the microprocessor;

reset configuration means for determining a state of at least one bit of the chip select control register means while the reset means is resetting the microprocessor; and the chip select means is responsive to the state of said at least one bit of the chip select control register means to provide an active chip select signal to a device external to the microprocessor during a first bus cycle executed by the microprocessor after the microprocessor has been reset.

7. An integrated circuit microprocessor according to claim 6 wherein the improvement further comprises:

the reset configuration means is responsive to a state of at least one input terminal of the microprocessor to determine the state of said at least one bit of the chip select control register means.

8. An integrated circuit microprocessor according to claim 1 wherein the improvement further comprises:

the chip select control register means also stores, under control of the central processing unit, a sixth bit field indicating a port size; and the chip select means is responsive to the states of the bits of the sixth bit field to selectively assert the chip select signal according to said port size.

9. An integrated circuit microprocessor according to claim 8 wherein the bus controller requires the assertion of bus cycle termination signals which encode port size information to terminate a bus cycle and wherein the improvement further comprises:

the chip select control register also stores, under control of the central processing unit, a seventh bit field; and the chip select means is responsive to the states of the bits of the seventh bit field and to the states of the bits of the sixth bit field to selectively assert the bus cycle termination control signals, the bus cycle termination signals being asserted after a number of wait states indicated by the states of the bits of the seventh bit field or being asserted, responsive to a particular value of the seventh bit field, to terminate the bus cycle earlier than a normal bus cycle termination.

10. An integrated circuit microprocessor comprising:

a central processing unit;

bus controller means coupled to the central processing unit and to a plurality of pins of the integrated circuit microprocessor for operating a bus external to the integrated circuit microprocessor; and chip select means coupled to the central processing unit and to a pin of the integrated circuit microprocessor for selectively providing, under control of the central processing unit, a chip select signal to a device external to the microprocessor;

wherein the improvement comprises:

a chip select control register means coupled to the chip select means and to the central processing unit for storing, under control of the central processing unit, a first bit field; and the chip select means is responsive to the states of the bits of the first bit field of the chip select control register means to selectively assert the chip select signal synchronized with a data strobe signal of the bus or synchronized with an address strobe signal of the bus.

11. An integrated circuit microprocessor according to claim 10 wherein the improvement further comprises:

the chip select control register means also stores, under control of the central processing unit, a second bit field; and the chip select means is responsive to the states of the bits of the second bit field of the chip select control register means to selectively assert the chip select signal only while the bus controller means is executing a write cycle of the bus, only while the bus controller is executing a read cycle of the bus or while the bus controller is executing either a read cycle or a write cycle of the bus.

12. An integrated circuit microprocessor according to claim 10 wherein the improvement further comprises:
the chip select control register means also stores, under control of the central processing unit, a third bit field; and
the chip select means is responsive to the states of the bits of the third bit field of the chip select control register means to selectively assert the chip select signal dependent upon an operating mode of the central processing unit.

13. An integrated circuit microprocessor according to claim 10 wherein the improvement further comprises:
the chip select control register means also stores, under control of the central processing unit, a fourth bit field; and
the chip select means is responsive to the states of the bits of the fourth bit field of the chip select control register means to selectively assert the chip select signal during an interrupt acknowledge cycle of the bus only if an interrupt level of the interrupt acknowledge cycle bears a predetermined relationship to the fourth bit field.

14. An integrated circuit microprocessor according to claim 13 wherein the improvement further comprises:
the chip select control register means also stores, under control of the central processing unit, a fifth bit field; and
the chip select means is responsive to the states of the bits of the fifth bit field of the chip select control register means to selectively provide an autovector signal to the central processing unit.

15. An integrated circuit microprocessor according to claim 10 wherein the improvement further comprises:
reset means for resetting the microprocessor;
reset configuration means for determining a state of at least one bit of the chip select control register means while the reset means is resetting the microprocessor; and
the chip select means is responsive to the state of said at least one bit of the chip select control register means to provide an active chip select signal to a device external to the microprocessor during a first bus cycle executed by the microprocessor after the microprocessor has been reset.

16. An integrated circuit microprocessor according to claim 15 wherein the improvement further comprises:
the reset configuration means is responsive to a state of at least one input terminal of the microprocessor to determine the state of said at least one bit of the chip select control register means.

17. An integrated circuit microprocessor according to claim 10 wherein the improvement further comprises:
the chip select control register means also stores, under control of the central processing unit, a sixth bit field indicating a port size; and
the chip select means is responsive to the states of the bits of the sixth bit field to selectively assert the chip select signal according to said port size.

18. An integrated circuit microprocessor according to claim 17 wherein the bus controller requires the assertion of bus cycle termination signals which encode port size information to terminate a bus cycle and wherein the improvement further comprises:
the chip select control register also stores, under control of the central processing unit, a seventh bit field; and
the chip select means is responsive to the states of the bits of the seventh bit field and to the states of the bits of the sixth bit field to selectively assert the bus cycle termination control signals, the bus cycle termination signals being asserted after a number of wait states indicated by the states of the bits of the seventh bit field or being asserted, responsive to a particular value of the seventh bit field, to terminate the bus cycle earlier than a normal bus cycle termination.

19. A method of operating an integrated circuit microprocessor comprising a central processing unit, a bus controller and a chip select signal generator, the method comprising the steps of:
storing, under control of the central processing unit, a first bit field in a chip select control register; and
selectively asserting the chip select signal, in response to the states of the bits of the first bit field, only while the bus controller is executing a write cycle, only while the bus controller is executing a read cycle or while the bus controller is executing either a read cycle or a write cycle.

20. A method according to claim 19 further comprising the steps of:
storing, under control of the central processing unit, a second bit field in the chip select control register; and
selectively asserting the chip select signal, in response to the states of the bits of the second bit field, synchronized with a data strobe signal or synchronized with an address strobe signal.

21. A method according to claim 19 further comprising the steps of:
storing, under control of the central processing unit, a third bit field in the chip select control register; and
selectively asserting the chip select signal, in response to the states of the bits of the third bit field, dependent upon an operating mode of the central processing unit.

22. A method according to claim 19 further comprising the steps of:
storing, under control of the central processing unit, a fourth bit field in the chip select control register; and
selectively asserting the chip select signal, in response to the states of the bits of the fourth bit field, while the bus controller is executing an interrupt acknowledge cycle.

23. A method according to claim 22 further comprising the steps of:
comparing an acknowledged interrupt level to the fourth bit field; and
selectively asserting the chip select signal only if the acknowledged interrupt level bears a predetermined relationship to the fourth bit field.

24. A method according to claim 22 further comprising the steps of:
storing, under control of the central processing unit, a fifth bit field in the chip select control register; and selectively asserting an autovector signal, in response to the states of the bits of the fifth bit field, while the bus controller is executing an interrupt acknowledge cycle.

25. A method according to claim 19 further comprising the steps of:

responding to a reset operation by determining a state of at least one input terminal of the microprocessor;

storing the determined state of said at least one bit in a predetermined bit field of the chip select control register; and selectively asserting the chip select signal, in response to the states of the bits of the predetermined bit field, during a first bus cycle executed by the bus controller after the reset operation is completed.

26. A method according to claim 19 further comprising the steps of:

storing, under control of the central processing unit, a sixth bit field in the chip select control register, the sixth bit field indicating a port size; and selectively asserting the chip select signal, in response to the states of the bits of the sixth bit field, according to said port size.

27. A method according to claim 26 further comprising the steps of:

storing, under control of the central processing unit, a seventh bit field in the chip select control register; and selectively asserting bus cycle termination signals which encode a port size in response to the states of the bits of the sixth and seventh bit fields, the bus cycle termination signals being asserted after a number of wait states indicated by the states of the bits of the seventh bit field or being asserted, in response to a particular value of the seventh bit field, to terminate a bus cycle earlier than a normal termination.

28. A method of operating an integrated circuit microprocessor comprising a central processing unit, a bus controller and a chip select signal generator, the method comprising the steps of:

storing, under control of the central processing unit, a first bit field in a chip select control register; and selectively asserting the chip select signal, in response to the states of the bits of the first bit field, synchronized with a data strobe signal or synchronized with an address strobe signal.

29. A method according to claim 28 further comprising the steps of:

storing, under control of the central processing unit, a second bit field in the chip select control register; and selectively asserting the chip select signal, in response to the states of the bits of the second bit field, only while the bus controller is executing a write cycle, only while the bus controller is executing a read cycle or while the bus controller is executing wither a read cycle or a write cycle.

30. A method according to claim 28 further comprising the steps of:

storing, under control of the central processing unit, a third bit field in the chip select control register; and selectively asserting the chip select signal, in response to the states of the bits of the third bit field, dependent upon an operating mode of the central processing unit.

31. A method according to claim 28 further comprising the steps of:

storing, under control of the central processing unit, a fourth bit field in the chip select control register; and selectively asserting the chip select signal, in response to the states of the bits of the fourth bit field, while the bus controller is executing an interrupt acknowledge cycle.

32. A method according to claim 31 further comprising the steps of:

comparing an acknowledged interrupt level to the fourth bit field; and selectively asserting the chip select signal only if the acknowledged interrupt level bears a predetermined relationship to the fourth bit field.

33. A method according to claim 31 further comprising the steps of:

storing, under control of the central processing unit, a fifth bit field in the chip select control register; and selectively asserting an autovector signal, in response to the states of the bits of the fifth bit field, while the bus controller is executing an interrupt acknowledge cycle.

34. A method according to claim 28 further comprising the steps of:

responding to a reset operation by determining a state of at least one input terminal of the microprocessor;

storing the determined state of said at least one bit in a predetermined bit field of the chip select control register; and selectively asserting the chip select signal, in response to the states of the bits of the predetermined bit field, during a first bus cycle executed by the bus controller after the reset operation is completed.

35. A method according to claim 28 further comprising the steps of:

storing, under control of the central processing unit, a sixth bit field in the chip select control register, the sixth bit field indicating a port size; and selectively asserting the chip select signal, in response to the states of the bits of the sixth bit field, according to said port size.

36. A method according to claim 35 further comprising the steps of:

storing, under control of the central processing unit, a seventh bit field in the chip select control register; and selectively asserting bus cycle termination signals which encode a port size in response to the states of the bits of the sixth and seventh bit fields, the bus cycle termination signals being asserted after a number of wait states indicated by the states of the bits of the seventh bit field or being asserted, in response to a particular value of the seventh bit field, to terminate a bus cycle earlier than a normal termination.

* * * * *